July 10, 1951  E. H. ALDEBORGH  2,560,203
SNAP GAUGE CONSTRUCTION
Filed Nov. 16, 1949
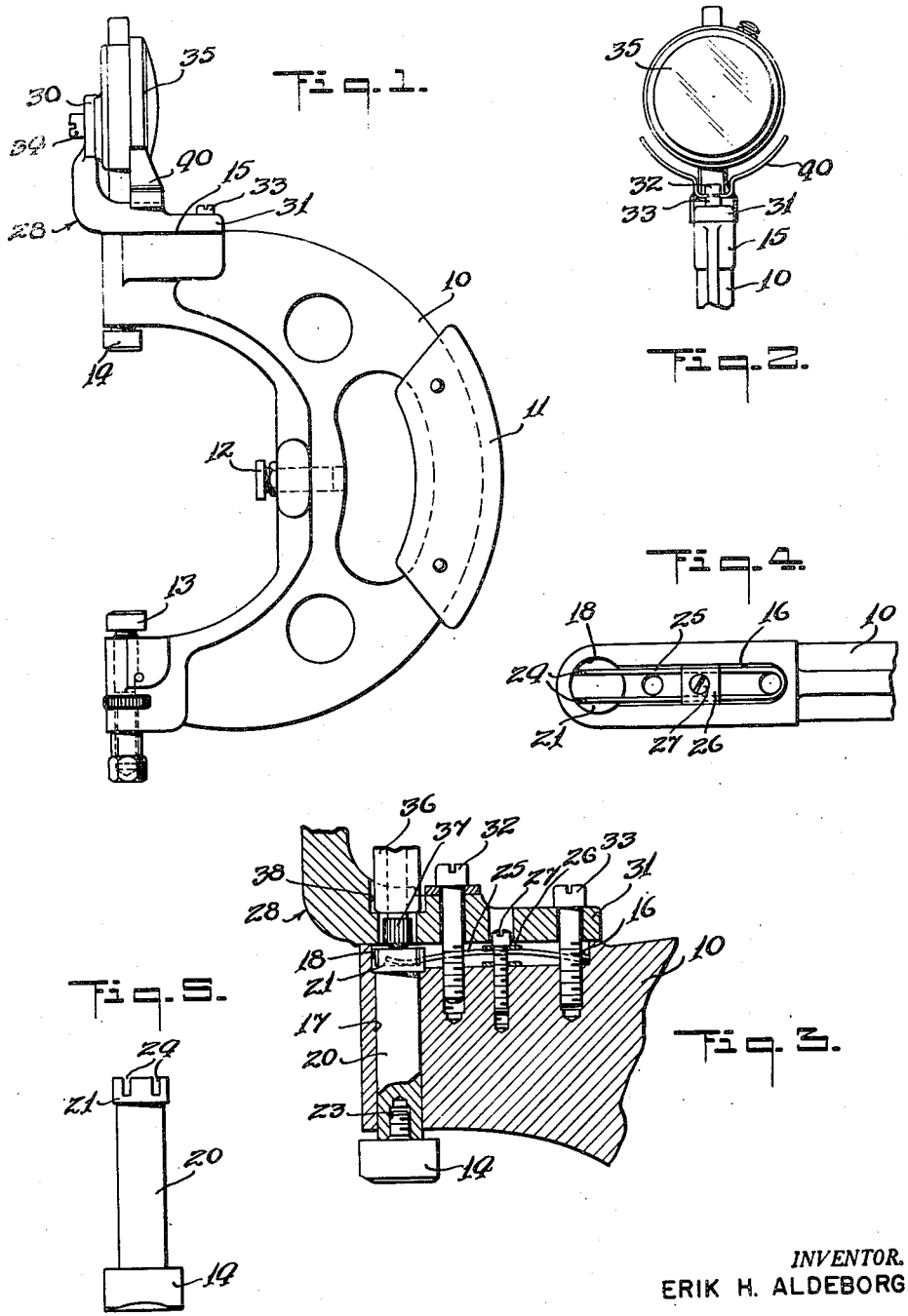
INVENTOR.
ERIK H. ALDEBORGH
BY Darby & Darby
ATTORNEYS Patented July 10, 1951

2,560,203

UNITED STATES PATENT OFFICE 2,560,203

SNAP GAUGE CONSTRUCTION

Erik H. Aldeborgh, Poughkeepsie, N. Y., assignor to Standard Gage Company, Inc., Poughkeepsie, N. Y., a corporation of New York Application November 16, 1949, Serial No. 127,624

6 Claims. (Cl. 33—147)

The present invention relates to dial snap gages and particularly to a construction for such snap gages which is extremely simple and economical. More particularly the invention pertains to a comparator dial snap gage construction which utilized the common U-shaped frame with very minor modifications, thereby making it possible to construct such a gage without redesign of the basic frame element.

Still more particularly the construction of the present invention provides a mounting means for a dial indicator upon a snap gage frame which mounting is adapted to support dial indicators of various types and sizes.

It is an object of my invention to provide a comparator dial snap gage consisting of a simple bracket member fixed to the common U-shaped frame and adapted to have mounted thereupon for cooperation with the measuring button of the snap gage a dial indicator of any one of a number of different types and sizes.

It is another object of my invention to provide a simple means for resiliently pressing the measuring plunger and button of the snap gage inwardly to contact the article to be measured, and to hold the resilient means in place in the structure without any complex means for so doing.

It is a further object of my invention to prevent rotation of the measuring plunger by use of the same means which resiliently presses against that plunger.

Other objects and features of the invention will appear when the following description is considered in connection with the annexed drawings, in which, Figure 1 is a side elevation of the dial snap gage of my invention;

Figure 2 is a fragmentary front elevation of the dial snap gage showing particularly the position of the dial indicator with respect to the snap gage frame as well as certain elements for guarding the dial indicator against damage;

Figure 3 is a fragmentary vertical cross-section illustrating particularly the mode of mounting the dial indicator upon the snap gage frame and for mounting the snap gage measuring button and plunger upon the gage frame and for resiliently pressing the plunger inwardly into contact with the piece to be measured;

Figure 4 is a fragmentary top plan view of the snap gage with the dial indicator supporting bracket and dial indicator removed showing particularly the means for resiliently urging the snap gage measuring plunger inwardly against the work, and by the same means preventing rotation of the plunger; and Figure 5 is an enlarged elevational view of the snap gage measuring plunger and button.

Referring now to the drawings, there is shown at 10 a U-shaped frame such as is in common use for supporting the measuring elements of a dial snap gage. This frame is supplied in the usual manner with a handle 11 and with an adjustable stop 12 for positioning articles to be measured. In the extremity of one arm of the frame 10 there is placed an adjustable anvil member 13 which cooperates with the measuring button 14 to measure articles inserted therebetween.

As respects the locking means therefor, the adjustable anvil 13 is of novel construction which, however, is not described nor claimed herein since it forms the subject matter of my copending application Serial No. 129,273, filed November 25, 1949.

The extremity of the frame 10 is formed in the usual manner to provide a boss or area of enlarged cross-section 15. In accordance with my invention there is provided in this boss a cavity 16 (see Figs. 3 and 4), the surfaces surrounding the cavity 16 being accurately machined to form a flat surface.

Extending through the extremity of the upper arm of the frame 10 adjacent the left end of the cavity 16 is a bore 17 which bore is enlarged at its upper end as shown at 18 and communicates with the cavity 16. Inserted in the bores 17 and 18 is a measuring plunger 20 having a head 21 which normally seats upon the shoulder formed between the portions 17 and 18 of the bore. The plunger 20 has fixed to its lower end a measuring button 14, the fastening being by any suitable means but shown as comprising a screw integral with the button 14 threadedly inserted in a tapped hole 23 in the plunger 20.

At its upper end the enlarged portion 21 of the measuring plunger 20 is provided with a pair of slots 24 in which the two ends of a spring wire 25 lie. The wire 25 is bent into a U-shaped form and is also bent upwardly at its center portion as seen particularly in Figure 3. This wire is inserted in the cavity 16 and lies along the edges thereof being held in position by a small clamping plate 26 extending across the two legs of the U into which the wire is formed and being held in position by a screw 27 which is threaded into a tapped hole in the frame 10.

A bracket 28 comprising a vertical arm 30 and a horizontal arm 31, which horizontal arm is accurately machined to a flat under surface, is positioned on the machined edges of the cavity 30 and is held in position by means of the screws 32 and 33 which extend through the cavity 16 and into tapped holes in the upper extremity 15 of the frame 10. The vertical arm 30 of bracket 28 is supplied with a slotted opening (not shown) through which a screw 34 may be inserted and threaded into the rear cover plate of a dial indicator such as that shown at 35.

The indicator is provided in the usual manner with a downwardly extending housing 36 (Fig. 3) from which the usual indicator measuring button 37 projects. Due to the slotted openings in the vertical arm of the bracket 28 the indicator may be adjusted so that the lower housing extremity extends into the enlarged upper portion of the opening 38 in the horizontal arm 31 of the bracket 28.

When in this position the measuring button 37 of the indicator will extend through the smaller lower portion of the opening 38 and be in contact with the upper surface of the head 21 of plunger 20. The usual spring means of the dial indicator will therefore hold the measuring button 37 against the head 21 of the plunger 20 and the spring wire 25 will in turn hold the plunger 20 in position with the head thereof against the shoulder formed between portions 17 and 18 of the bore in boss 15, the spring 25 will at the same time prevent the plunger 20 from turning.

In order to protect the dial indicator 35 a guard 40 is provided (Figures 1 and 2) which guard is a metal piece bent in the shape shown in Figure 2 and held in position by being placed beneath the head of the screw 32.

It will be apparent from the above that a piece to be measured will be inserted between the anvil 13 and the measuring button 14 and that the measuring button will be raised causing the dial indicator measuring button to likewise be raised to give an indication of the dimension of the piece on the dial indicator. Of course, as is common practice, the dimension to be measured may be set on the indicator by the use of standards such as Johansson or Hoke blocks. Thus, the set dimension will be within the tolerance limits and the dial indicator will show deviation from the standard dimension in either direction.

While I have described a preferred form of my invention, it will be understood that other modifications may be made within the scope of the invention and I wish therefore to be limited not by the foregoing description, but on the contrary solely by the claims granted to me.

What I claim is:

1. A dial snap gage comprising a generally U-shaped frame having a measuring anvil in one extremity thereof, a measuring plunger, a measuring button cooperating with said measuring anvil, said button being fixed to the inner end of said measuring plunger, said plunger being reciprocably mounted in the other extremity of said frame, the outer portion of said last-mentioned frame extremity having a shallow cavity therein, said cavity communicating with the outer end of the bore in which said measuring plunger reciprocates, a leaf spring located in said cavity and extending into contact with said measuring plunger, and bracket means covering said cavity, said bracket means serving to support a dial indicator with its plunger in contact with said measuring plunger.

2. A dial snap gage comprising a generally U-shaped frame having a measuring anvil in one extremity thereof, a measuring plunger, a measuring button cooperating with said measuring anvil, said button being fixed to the inner end of said measuring plunger, said plunger being reciprocably mounted in the other extremity of said frame, said last-mentioned frame extremity having a cavity in the outer portion thereof, said cavity communicating with the bore in which said measuring plunger reciprocates, a slotted head on said measuring plunger, spring means comprising a wire bent into generally U-shape, said spring means being located in said cavity and having its ends projecting into the slots in said plunger head, and a dial indicator supporting bracket fixed to said second-mentioned frame extremity, said bracket having a vertical arm and a horizontal arm, said horizontal arm covering said cavity and having an aperture therein in alinement with said measuring plunger whereby a dial indicator may be supported upon said vertical arm with its measuring button in contact with said measuring plunger head.

3. In a dial snap gage, in combination, a generally U-shaped frame member, a measuring anvil fixed to the inner surface of one extremity of said member, a measuring plunger reciprocably mounted in a bore in the other extremity of said frame member, a measuring button adapted to cooperate with said measuring anvil mounted at the inner end of said measuring plunger, an enlarged head at the opposite end of said measuring plunger, said head fitting in an enlarged outer portion of said bore to thereby limit the inward movement of said plunger, said second extremity having a cavity formed in the outer surface thereof, said cavity communicating with the enlarged outer portion of said measuring plunger bore, a resilient means mounted in said cavity and extending into contact with said enlarged head of said measuring plunger to thereby urge said plunger inwardly, an angle bracket mounted on said second mentioned frame extremity and over said cavity, said angle bracket having an arm projecting therefrom generally parallel to the axis of said measuring plunger, and an aperture therein in alinement with said measuring plunger, and means for mounting a dial indicator on said arm with the measuring plunger thereof extending through said bracket aperture and into contact with said measuring plunger head.

4. In a dial snap gage, in combination, a generally U-shaped frame member, a measuring anvil fixed to the inner surface of one extremity of said member, a measuring plunger reciprocably mounted in a bore in the other extremity of said frame member, a measuring button adapted to cooperate with said measuring anvil mounted at the inner end of said measuring plunger, an enlarged head at the opposite end of said measuring plunger, said head fitting in an enlarged outer portion of said bore to thereby limit the inward movement of said plunger, said second extremity having a cavity formed in the outer surface thereof, said cavity communicating with the enlarged outer portion of said measuring plunger bore, slots in the outer surface of said plunger head, a spring wire of generally U-shape fixed in said cavity adjacent the walls thereof and having its ends extending into said plunger head slots to thereby urge said plunger inwardly, an angle bracket mounted on said second mentioned frame extremity and over said cavity, said angle bracket having an arm projecting therefrom generally parallel to the axis of said measuring plunger, and an aperture therein in alinement with said measuring plunger, and means for mounting a dial indicator on said arm with the measuring plunger thereof extending through said bracket aperture and into contact with said measuring plunger head.

5. A dial snap gage comprising a generally U-shaped frame having a measuring anvil in one extremity thereof, a measuring plunger measuring button cooperating with said measuring anvil, said button being fixed to the inner end of said measuring plunger, said plunger being reciprocably mounted in the other extremity of said frame, the outer end of said plunger being provided with a pair of parallel slots, the outer portion of said last-mentioned frame extremity having a cavity therein, said cavity communicating with the bore in which said measuring plunger reciprocates, a resilient means located in said cavity and extending into said slots in said measuring plunger, and bracket means covering said cavity, said bracket means serving to support a dial indicator with its plunger in contact with said measuring plunger.

6. In a dial snap gage, in combination, a generally U-shaped frame member, a measuring anvil fixed to the inner surface of one extremity of said member, a measuring plunger reciprocably mounted in a bore in the second extremity of said frame member, a measuring button adapted to cooperate with said measuring anvil mounted at the inner end of said measuring plunger, an enlarged head at the opposite end of said measuring plunger, said head having a pair of parallel slots therein, said head fitting in an enlarged outer portion of said bore to thereby limit the inward movement of said plunger, the outer surface of said second extremity having a cavity formed therein, said cavity communicating with the enlarged outer portion of said measuring plunger bore, resilient means mounted in said cavity and extending into said parallel slots of said enlarged head of said measuring plunger to thereby urge said plunger inwardly while preventing the rotation of said plunger, an angle bracket mounted on said second mentioned frame extremity and over said cavity, said angle bracket having an arm projecting therefrom generally parallel to the axis of said measuring plunger and an aperture therein in alinement with said measuring plunger, and means for mounting a dial indicator on said arm with the measuring plunger thereof extending through said bracket aperture and into contact with said measuring plunger head.

ERIK H. ALDEBORGH.

REFERENCES CITED

The following references are of record in the file of this patent:

UNITED STATES PATENTS

| Number | Name | Date |
| --- | --- | --- |
| 1,664,583 | Wheelock | Apr. 3, 1928 |
| 2,419,433 | Aller | Apr. 22, 1947 |
| 2,445,875 | Emery | July 27, 1948 |